(No Model.)

G. A. WRISLEY.
SOAP.

No. 282,145. Patented July 31, 1883.

Witnesses
W. C. Curlies
Jno. C. MacGregor

Inventor
George A. Wrisley
By Geo. R. Cutler,
Attorney

UNITED STATES PATENT OFFICE.

GEORGE A. WRISLEY, OF CHICAGO, ILLINOIS, ASSIGNOR TO GEORGE A. WRISLEY & CO., OF SAME PLACE.

SOAP.

SPECIFICATION forming part of Letters Patent No. 282,145, dated July 31, 1883.

Application filed December 26, 1882. (No model.)

*To all whom it may concern:*

Be it known that I, GEORGE A. WRISLEY, a citizen of the United States, residing at Chicago, in the county of Cook and State of Illinois, have invented a certain new and useful Improvement in the Manufacture of Soap, of which the following is a specification, reference being made to the accompanying drawings, in which—

Figure 1:
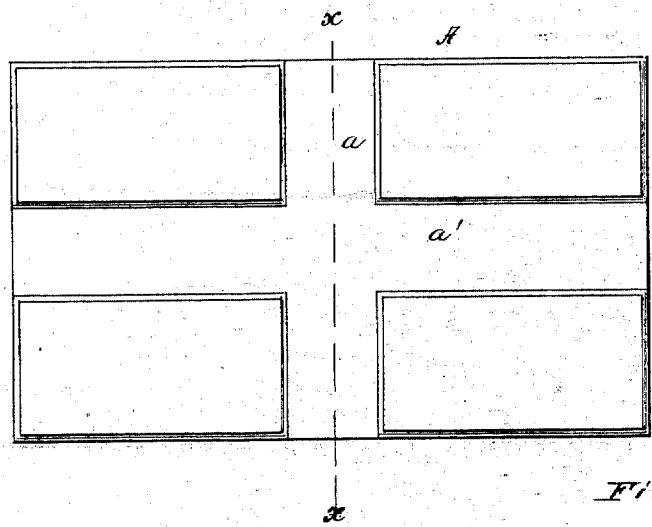
Figure 2:
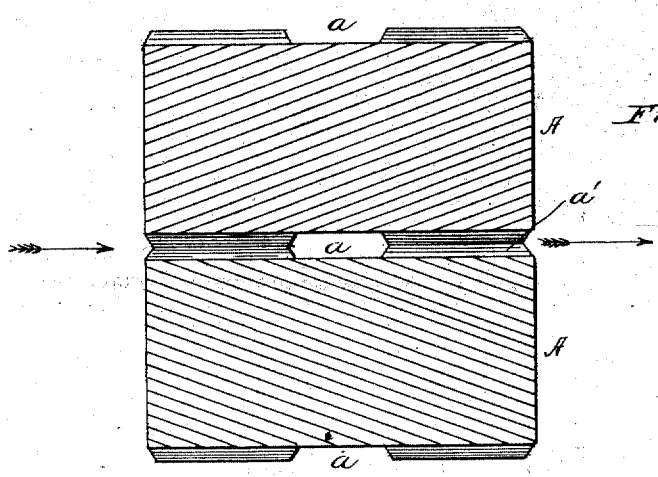

Figure 1 is a plan view of a cake of soap embodying my improvements; and Fig. 2 is a cross-section, taken on the line $x\ x$ of Fig. 1, of said cake, this sectional view being in duplicate to show how one cake is packed against another, and the channels transverse to the cake being like those crossing them, except as to length.

My invention consists of a cake of soap having one or more surfaces, each of which is provided with one or more channels.

The drawings illustrate one embodiment of my invention.

In the drawings, A A represent rectangular cakes of soap. These cakes are each provided in each of two opposite plane surfaces with intersecting channels $a$ and $a'$, running at right angles to each other along the center of the surface in which they lie. When these cakes are packed one against another, as shown in Fig. 2, evaporation takes place more surely and quickly from those parts of the cakes which are still left in contact.

The object of the invention is to secure automatically, in the packing of soap, suitable provision for exposing its surfaces, so that its moisture will continue to evaporate with rapidity after the manufacture of the soap has been so far completed that the necessity for immediate shipment in boxes or for economy in storage demands that the soap be packed with the cakes in close proximity to each other. As it is well known that soap thoroughly dried lasts longer, and is therefore more economical than that containing the percentage of moisture which is present in freshly-made soap, the advantage of automatically so packing the soap that it will be ventilated is sufficiently obvious.

A number of cakes of soap may be channeled so similarly to each other that when the end of one cake is placed against the end of another cake the ends of the adjacent channels will coincide and form one continuous channel.

The best mode known to me of fully realizing the advantages of my invention is to proceed as follows: The cakes are packed side by side, as shown in Fig. 2, so as to form a row. The first cake packed is packed against the wall of the room, or that of the box in which it is shipped. When one row has been formed, other parallel rows of similar channeled cakes are formed above and alongside of the first row to an indefinite extent, each row beginning at the wall of the room or box, so as to prevent the parallel rows breaking joints. The pile thus packed, if composed of similar channeled cakes, will be automatically perforated throughout, and, in the case of the cake above described, vertically as well as horizontally, owing to the coincidence between the cakes as to their size and the location of their channels.

The automatic drying of soap, as above described, by lessening the labor of packing and also the time of storage (and consequently the amount of storage-room) required for thus perfecting its manufacture, of course either reduces the cost of production of any given quality, or else increases the value of soap of any given cost, as the case may be.

When the cake is channeled on both sides, as shown, there will always be a channel where the sides of the cakes lie in contact with the sides of the box in which they may be packed for shipment or storage. When there are intersecting channels in the same side of a cake, a larger part of the surface of that side may in practice be indented than where there are channels only in one direction; and on shelves, where soap is packed against the wall of the building, a draft may enter the pile through the horizontal channels at the front of the pile and leave through the vertical channels at the top of the pile. The channels may be made by suitable dies inserted in an ordinary soap-press.

I am aware that a perforated cake of soap is not new, and I therefore do not claim the same.

The advantage of accomplishing the drying of soap by channels, rather than by holes extending entirely through the cake from side to side, is that the former construction can be manufactured by the use simply of suitable dies inserted in ordinary soap-presses, whereas when soap is to be provided with holes extending entirely through it from side to side punches must be used, which will entirely remove portions of the cake, thus wasting the same, and special and expensive machinery is required in the punching process in order to hold the cake while withdrawing the punch.

I do not claim a cake of soap provided with indentations designed for the reception of the fingers of the user in grasping the cake, whereby the grip is improved.

Having thus described my invention, what I claim as new, and desire to secure by Letters Patent, is—

1. A cake of soap having one or more channeled surfaces for ventilating the soap when packed, substantially as set forth.

2. A cake of soap having opposite channeled surfaces for ventilating the soap when packed, substantially as set forth.

3. A cake of soap having intersecting channels for ventilating the soap when packed, substantially as set forth.

4. A rectangular cake of soap having channels in one or more surfaces for ventilating the soap when packed, substantially as set forth.

GEORGE A. WRISLEY.

Witnesses:
GEO. R. CUTLER,
NETTIE WRISLEY.

Correction in Letters Patent No. 282,145.

It is hereby certified that Letters Patent No. 282,145, dated July 31, 1883, for an improvement in "Soap," were erroneously granted to "George A. Wrisley & Co., their heirs or assigns," where it appears by assignment on record in the Patent Office that said Letters Patent should have been granted to *G. A. Wrisley & Co., its successors or assigns,* as a corporation; and that the proper corrections have been made in the files and records of the case in the Patent Office, and should be read in the grant of said Letters Patent to make it conform therewith.

Signed, countersigned, and sealed this 21st day of August, A. D. 1883.

[SEAL.]

M. L. JOSLYN,
*Acting Secretary of the Interior.*

Countersigned:

E. M. MARBLE,
*Commissioner of Patents.*